(No Model.)
T. D. LINES.
VEHICLE BODY SUPPORT.
No. 313,350. Patented Mar. 3, 1885.
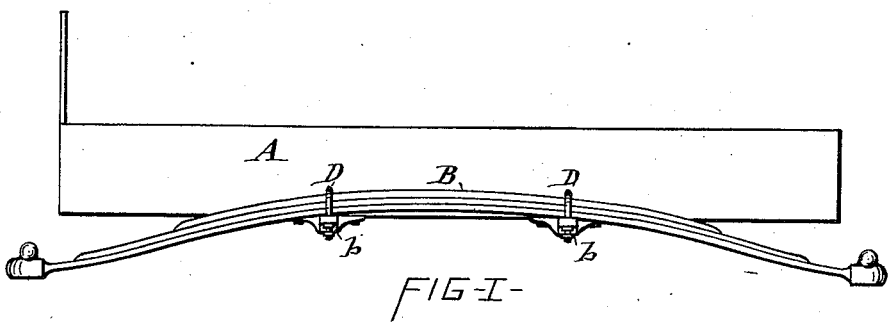
FIG. I.
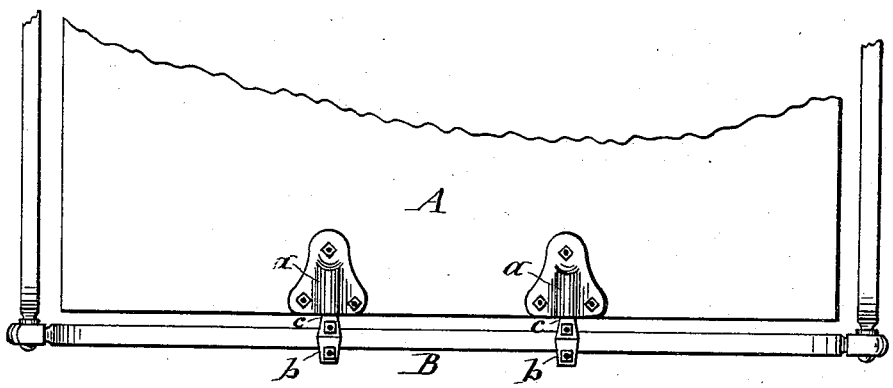
FIG. II.
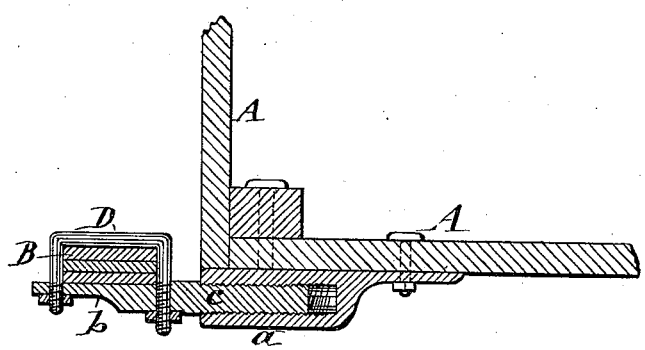
FIG. III.
WITNESSES
INVENTOR
Thomas D. Lines

United States Patent Office.

THOMAS D. LINES, OF SYRACUSE, NEW YORK.

VEHICLE-BODY SUPPORT.

SPECIFICATION forming part of Letters Patent No. 313,350, dated March 3, 1885.

Application filed May 21, 1884. (No model.)

*To all whom it may concern:*

Be it known that I, THOMAS D. LINES, of Syracuse, in the county of Onondaga, in the State of New York, have invented new and useful Improvements in Vehicle-Body Supports, of which the following, taken in connection with the accompanying drawings, is a full, clear, and exact description.

This invention relates to the supports of vehicle-bodies on the central portion of side springs, said supports usually consisting of cross-bars secured to the underside of the central portion of the body and extending under the side springs, to which said cross-bars are fastened by clips embracing the springs and clamping the cross-bars firmly thereon, the connection of said parts being thus perfectly rigid.

Experience has proved that owing to the vibration of the spring when subjected to strain the aforesaid connection, especially the body-supporting bar, receives a torsional strain, which tends to loosen the attachment of said bar on the body.

It is to overcome the aforesaid defects without causing the liability of rattling of the parts which my invention has for its object; and to that end it consists in the peculiar construction and combination of parts hereinafter fully described, and specifically set forth in the claims.

In the annexed drawings, Figure 1 is a side view of a vehicle-body hung on the side spring by my invention. Fig. 2 is an inverted plan view of one side thereof; and Fig. 3 is an enlarged sectional view of my improved hanger and its connection with the side spring and body.

Similar letters of reference indicate corresponding parts.

B represents the side spring of a vehicle, and A denotes the body hung on the central portion of the side spring. The connection of said body with the side spring I form of sockets *a a*, firmly secured to the under side of the central portion of the body A. The clip-bars *b b*, which are clipped on the central portion of the side spring by clips D D, in the usual manner, I form with extensions *c c*, which are integral with the clip-bars and constitute gudgeons or trunnions, which enter the sockets *a a*, and are adapted to oscillate or partly rotate therein.

In order to maintain the aforesaid connection intact, without causing liability of rattling in the operation of the same, I provide the interior of the socket *a* with screw-threads, and the extension or gudgeon *c* with corresponding screw-threads, and properly fit said parts together, so that they become perfectly interlocked by the screw-threads and have a secure hold on each other without depriving the gudgeon of its oscillatory or partial rotary motion, and also without allowing the parts to rattle.

It is obvious that the component parts of the coupling or hanger can be arranged conversely in relation to the body and spring—*i. e.*, the gudgeon can be secured to the body and the socket attached to the spring; hence I do not limit myself in that respect. I do not, however, claim, broadly, a spring coupling or connection composed of a trunnion on one of the members entering a socket on the other member, as I am aware the same are used for the connection of the ends of springs; but What I do claim specifically is—

1. In combination with the body and side springs, the sockets *a a*, secured to the central portion of the body, clips D D on the central portion of the side spring, and clip-bars *b b*, formed with trunnions *c c* entering the sockets *a a*, substantially as described and shown.

2. In combination with the body and side springs, the sockets *a a*, secured to the central portion of the body and screw-threaded internally, clips D D on the central portion of the side spring, and clip-bars *b b*, formed with screw-threaded trunnions entering the sockets *a a*, substantially as specified and shown.

In testimony whereof I have hereunto signed my name and affixed my seal, in the presence of two attesting witnesses, at Syracuse, in the county of Onondaga, in the State of New York, this 12th day of May, 1884.

THOMAS D. LINES. [L. S.]

Witnesses:
 FREDERICK H. GIBBS,
 C. BENDIXON.